Dec. 12, 1967  E. G. CASTAGNA  3,357,438
UNITIZED HAIRCLIP
Filed Dec. 24, 1964

INVENTOR
EUGENE G. CASTAGNA
BY *P. E. Johnston*
*George W. Wasson*
ATTORNEYS

United States Patent Office 3,357,438
Patented Dec. 12, 1967

3,357,438
UNITIZED HAIRCLIP
Eugene G. Castagna, Clark, N.J., assignor to Chevron Research Company, a corporation of Delaware
Filed Dec. 24, 1964, Ser. No. 421,012
4 Claims. (Cl. 132—46)

This invention relates in general to hairclips and more particularly to one-piece hairclips formed of plastics material.

An object of the invention is the provision of a low-cost, one-piece plastic hairclip of the type having twin lever members pivotable about a correlative area therebetween and a spring means serving the dual function of holding the lever members relative to one another and urging the members toward a closed position.

Examples of this type of clip formed of metal are found in U.S. Patents Nos. 3,030,970, issued Apr. 24, 1962 to J. L. Gold entitled, "Pivoted Spring Clamp," and 3,101,725 issued Aug. 27, 1963 to K. Reines entitled, "Hair Curl Clip," in which the clips fundamentally consist of:

(1) Two lever members pivotable about a correlative area therebetween, and having handle and clamping portions, and (2) A restoring means struck from the material of one of the members and passing through an opening of the other member to attach to a remote location.

Briefly the invention utilizes plastics material in the formation of a one-piece hairclip having a spring means between the lever members for securing the lever members relative to one another and urging these members toward a closed position. In accordance with the invention, sufficient gripping power is developed between the lever members by constructing the spring means with two transverse folds along its length, one of which urges the lever members together toward the closed position, and the other of which forms a concave camming surface for decreasing the radius of curvature of the first fold as the lever members part as to receive an object such as a formed haircurl. As the lever members close about the curl, the camming surface retains the curvature of the first fold in the protracted position. Inasmuch as the curvature of the first fold is inversely proportional to gripping power, the net decrease in curvature insures that adequate gripping power is developed between the lever members.

Other objects and features of the invention will become more apparent from the following description of the preferred embodiment in which.

Figure 1:
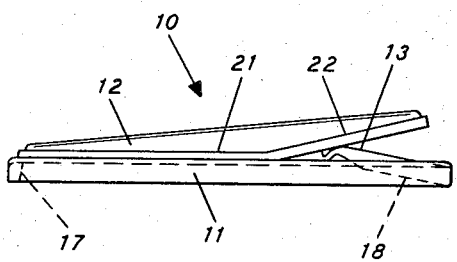
FIGURE 1 is a side elevational view of a hairclip in accordance with the invention.
Figure 2:
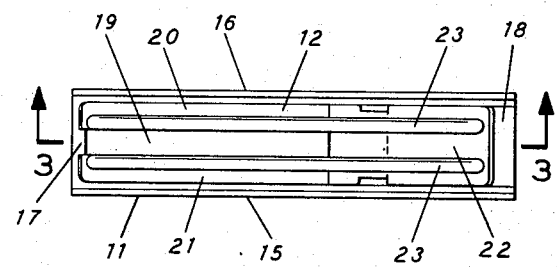
FIGURE 2 is a plane view of the clip of FIGURE 1.

Referring now to the drawings, particularly to FIGURE 1, the clip in accordance with the invention is indicated at 10. It includes elongated but overlying lever members 11 and 12. The lever members are attached together through a restoring means 13. They are not however complementary as many prior art clips but vary in construction to facilitate one-piece fabrication. More particularly, as shown in FIGURE 2, the lever 11 comprises a box-like frame including longitudinal support members 15 and 16. The members 15 and 16 are closed at one end by transverse support 17 and at the other end, by base 18 but are not connected over their central portions. The aperture thus formed is indicated at 19. The support 17 adds rigidity to the lever 11 and has an upper surface in contact with lever 12.

The lever 12 includes bifurcations 20 and 21 joined together at transverse support 22. The support 22 diverges upwardly as viewed in FIGURE 3 to form a handle. Ribs 23 extend the length of the lever 12, to prevent longitudinal deflections in the flanges as clamping of an object occurs.

Figure 3:
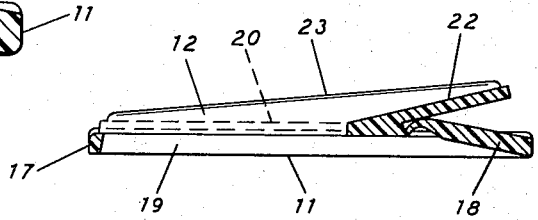
FIGURE 3 is a sectional view taken along line 3—3 of FIGURE 2.

Contact between the lever members in the closed position as viewed in FIGURE 3 occurs primarily at the transverse support 17 where the ends of bifurcations 20 and 21 overlap that support. The fact that the width of supports 15 and 16 is approximately equal to that of the bifurcations prevents the occurrence of additional contact along the length of the lever members. However, clamping pressure is developed along intersecting planes when an object whose width is greater than that of the lever 11 is placed transversely between the members.

Figure 5:
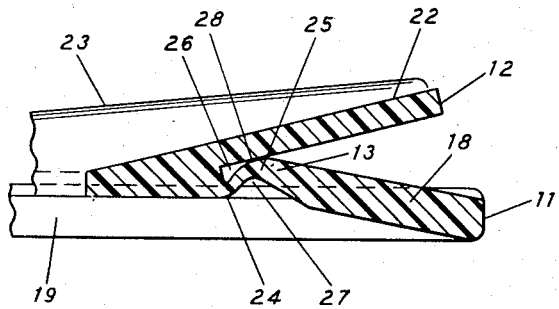
FIGURE 5 is a detail of a portion of the hairclip of FIGURE 1.

The lever members are urged toward a closed position by restoring means 13. As indicated in FIGURE 5, the means 13 forms a spring for urging the lever members to a closed position as well as holds the lever members relative to one another. It is struck from the material comprising both the base 18 of the lever member 11 and the transverse support 22 of the lever member 12 as opposed to the prior art clips in which the spring means is struck from material comprising only one of these members. At its junction with support 22, there is formed a first curved fold 24; intermediate the end of the restoring means there is formed a second curved fold 25.

The fold 24 functions as a leaf spring and is formed by folding the restoring means back upon itself. The thickness of the fold 24 is reduced progressively along its length reaching a minimum at its junction with the support 22. As shown the ends of the fold are convexly bent with respect to the lever member 11 to resiliently urge the lever member 12 toward a closed position with respect to the lever member 11. Its imaginary axis of formation is generally indicated at 26.

Figure 4:
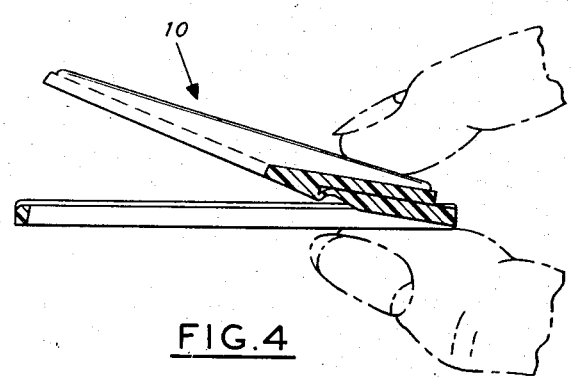
FIGURE 4 is a section with the clip similar to FIGURE 3 but in which the clip is open to receive an object.

The fold 25 also functions somewhat like a leaf spring but has ends permanently bent oppositely to those of fold 24. Its imaginary axis of formation 27 consequently lies below that of the fold 24 and on an opposite side of the restoring means 13. It is not under tensional stress when the lever members are in a closed position. It does have an apex portion 28 disconnectably connected with the support 22, however, and that connection acts as a cam to provide relative movement to the fold 24 when the lever members part, as to receive and grip the curl. When the lever members are in the closed position, the fold 25 lies in line contact with the support 22. But as the clamping portions of the members part, see FIGURE 4, the area of contact increases due to the more rigid construction of the fold 25 compared to that of the fold 24. As a result, the remote end of the fold 24 (on the left as viewed in each of the figures) is forced to travel upward towards lever member 12 resulting in (1) a decrease in the radius of curvature of the fold 24, and (2) an increase in the gripping power of the clip. But as the lever members close about the curl, they do not return to their normal position as illustrated in FIGURE 1, but are spaced apart by the thickness of the retained curl. Consequently, the radius of curvature of the fold 24 also remains in its bent extended position to maintain the gripping power of the clip at a relatively high level. After removing the clip from the curl, the lever members return to their normal closed position as illustrated in FIGURE 1.

A hairclip in accordance with the invention has been successfully fabricated for polypropylene and tested and has the following dimensions:

| | Inches |
|---|---|
| Lever members 11 and 12, length | 2⅛ |
| Bifurcations 20 and 21, length | 1⅜ |
| Fold 24, thickness | .020 |
| Fold 25, thickness | .045 |
| Base 18, length | ⅝ |

Figure 6:
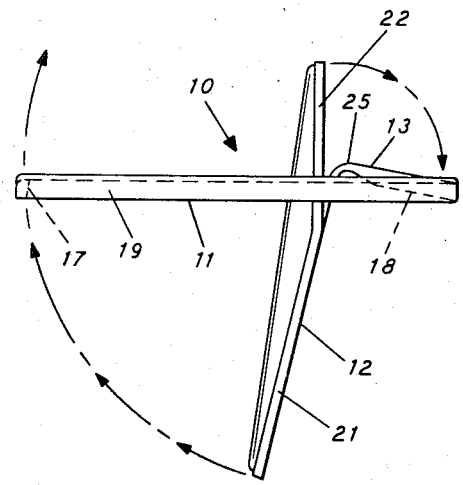
FIGURE 6 is a side elevational view of a hairclip of FIGURE 1 illustrating the method aspects of the invention.

Molding techniques are preferred in constructing the clip of FIGURE 1. After the mold is forced and the mold filled with the plastics material, the clip blank is removed from the mold. As indicated in FIGURE 6, the clip blank is formed such that the lever member 12 initially extends through the aperture 19 formed between the supports of the lever member 11. Consequently the resorting means 13 is at a relaxed state so that fold 24 does not exist. Fold 25 does not contact the support 22 of the lever member 12.

Tensioning the restoring means 13 to form fold 24 is achieved by rotating the lever member 12 relative to lever member 11 as indicated in FIGURE 6. The bifurcations 20 and 21 initially contact the lower surfaces of the supports of the lever 11 but are passed through the aperture 19 to assume the position of the clip of FIGURE 1 upon applying upward force to them. Passage is aided by (1) having the ends of the ribs 23 rounded and slightly shorter than the bifurcations, and (2) forming the fold 24 flexible enough to be slightly displaced towards the fold 25 as contact occurs (to the right as viewed in each of the figures). Thus as the ends of the ribs contact the lever 11, there occurs two types of movement which aids inside-out passage of the levers: inward bending of bifurcations relative to the supports of lever 11 and lateral movement of the fold 24 relative to base 18 of lever 12. Placement of the bifurcations in contact with the upper surface of the support 17 completes construction of the clip.

I claim:

1. A one-piece clip including first and second superposed elongated lever members forming clamping portions at one end of their ends and handle portions at the other of their ends, and a resilient restoring means struck from the material of both of said level members adapted to interconnect said lever members and to urge them toward a closed position, said resilient restoring means extending between said handle portions of said first and second lever members in a direction toward their clamping portions, said restoring means including oppositely curved first and second folds consecutively located therealong in a direction toward clamping portions of said lever members, said first fold including a permanently formed, fulcrum-forming camming surface adapted to engage a surface of said handle portion to said second member so as to allow said lever members to be pivoted relative to one another, said second fold being located adjacent to said handle portion of said second lever member and adapted to place said restoring means in a stressed condition so that to urge said second lever member in a first direction toward a closed position with respect to said first lever member, said first lever member including an aperture longitudinally extending over a major portion thereof, said second lever member including cantilevered clamping means attached to said handle portion at a location adjacent to said restoring means, said cantilevered clamping means having an end portion being urged by said restoring means into contact with a broad surface of said clamping portion of said first level member at said aperture, said second lever member including at least said clamping means being adapted to pass through the plane of said aperture of said first level member in a second direction opposite to said urging direction of said second lever member so as to form said second fold of said restoring means and thereby place said restoring means in a stressed condition.

2. A clip in accordance with claim 1 further characterized in that said first and second lever means and said restoring means are formed of a synthetic plastic material.

3. A clip in accordance with claim 1 further characterized in that said cantilevered clamping means of said second lever member and said restoring means are adapted to be flexibly formed so as to allow temporary change of their location relative to said first lever member so as to allow said passage to said second lever member relative to said aperture of said first lever member.

4. The clip of claim 1 in which said first lever member includes a base, thin longitudinal supports, and a transverse support connecting said longitudinal supports remove from said base, said longitudinal supports being attached to said transverse support and said base at opposite ends to define said aperture therebetween, and in which said second lever member includes cantilevered bifurcated means adapted to have a transverse dimension related to that of said aperture of said first lever member so as to allow passage of said bifuracted means through the plane of said aperture so as to form said second fold of said restoring means and thereby place said restoring means in a stressed condition.

References Cited

UNITED STATES PATENTS

| 2,111,130 | 11/1963 | Dekel | 132—48 |
| 3,223,095 | 12/1965 | Seekings et al. | 132—46 |

RICHARD A. GAUDET, *Primary Examiner.*

G. E. McNEILL, *Assistant Examiner.*